United States Patent [19]
Salter

[11] 4,165,881
[45] Aug. 28, 1979

[54] FLEXIBLE SEAL AND SEAL ASSEMBLY

[75] Inventor: Lowell S. Salter, Shrewsbury, Mass.

[73] Assignee: Morgan Construction Company, Worcester, Mass.

[21] Appl. No.: 801,430

[22] Filed: May 27, 1977

Related U.S. Application Data

[63] Continuation of Ser. No. 705,608, Jul. 15, 1976, abandoned.

[51] Int. Cl.² ............................................. F16J 15/32
[52] U.S. Cl. ...................................... 277/152; 277/95
[58] Field of Search .................. 277/95, 63, 206, 152, 277/153

[56] References Cited

U.S. PATENT DOCUMENTS

| | | | |
|---|---|---|---|
| 2,718,444 | 9/1955 | Harris | 277/63 |
| 2,818,283 | 12/1957 | Hutterer | 277/152 |
| 3,054,620 | 9/1962 | Schwing | 277/95 |
| 3,545,774 | 12/1970 | Rickley | 277/95 |
| 4,022,480 | 5/1977 | Salter | 277/95 |

*Primary Examiner*—Robert I. Smith
*Attorney, Agent, or Firm*—Thompson, Birch, Gauthier & Samuels

[57] ABSTRACT

A flexible seal and seal assembly is disclosed for use in rolling mills where roll necks are journalled for rotation in oil film bearings.

The flexible seal has a circular seal body adapted to be mounted in sealing engagement on a tapered section of the roll neck for rotation therewith, and a pair of circular flexible flanges integral with and extending radially outwardly from the seal body with at least one of the flexible flanges being provided at its outer edge with an angularly extending flexible annular lip.

The seal assembly includes the aforesaid flexible seal surrounded by a circular non-rotatable rigid seal end plate having a radially inwardly extending rigid flange separating oppositely extending rigid shoulders. The rigid flange is located between the flexible flanges of the seal, with its inner edge spaced radially from the seal body. The shoulders of the seal end plate have cylindrical shoulder surfaces which are parallel to the rotational axis of the roll neck and which are arranged to be sealingly engaged by the flexible annular lips of the seal.

11 Claims, 7 Drawing Figures

FLEXIBLE SEAL AND SEAL ASSEMBLY

This is a continuation of application Ser. No. 705,608 filed July 15, 1976 now abandoned.

BACKGROUND OF THE INVENTION

This invention relates generally to flexible seals and seal assemblies of the type employed in rolling mills where roll necks are journalled for rotation in oil film bearings.

U.S. Pat. No. 2,868,574 discloses one well known example of a prior art seal and seal assembly which has been employed extensively and with considerable success in the rolling mill field. In this arrangement, a flexible seal is mounted on the tapered section of the roll neck for rotation therewith. The seal is surrounded by a stationary circular seal end plate having a radially inwardly extending rigid flange separating oppositely arranged shoulders. The flexible seal has radially outwardly extending flexible flanges which are in sliding contact with inclined shoulder surfaces on the seal end plate. The flange/shoulder surface interface on the bearing side serves to retain bearing lubricant in the bearing, and the flange/shoulder surface interface on the roll side serves to exclude contaminants such as cooling water, mill scale, etc. from penetrating into the bearing.

The above-described arrangement has been in large measure effective as evidenced by its widespread commercial use. Still, problems have been experienced with regard to leakage of bearing lubricant, contamination of bearings and excessive wear of seal components. It has now been determined that these problems are occasioned primarily by the design of the flexible seal flanges, and the manner in which they slidingly engage the surrounding shoulder surfaces of the seal end plate. More particularly, in this prior art construction, the flexible seal flanges are relatively thick and heavy throughout their entire radial length. When the seal is installed, these flanges are bent or flared in opposite directions by the surrounding shoulders of the seal end plate. This creates a heavy pressure at the flange/shoulder friction interface which in turn can result in excessive friction and heat being generated during operation of the mill. The excessive friction accelerates wear of both the flexible flanges and the shoulder surfaces of the seal end plate. The excessive heat has an added adverse effect on the flexible flanges, causing the flange ends to harden and crack. When the flexible flanges become worn, hardened or cracked, the flexible seal must be replaced. Likewise, when the shoulder surfaces on the seal end plate become worn, they must either be reground or if this is no longer possible, the entire seal end plate must be replaced. Such replacements and repairs are both time consuming and expensive. Moreover, any leakage occuring prior to replacement or repair of seal components can result in loss or contamination of bearing lubricant. The foregoing problems, particularly those related to cracking and hardening of the flange ends, have gradually become more severe as rolling speeds have increased.

It has also been determined that the relatively thick heavy flanges of the prior art seal are not as flexible as they should be, and that after being installed, they have a tendency to become permanently distorted (a condition referred to as "taking a set"). This loss of resiliency can have a further adverse effect on sealing integrity.

The oppositely inclined shoulder surfaces on the seal end plate shoulders also present problems, particularly when the roll undergoes axial shifting, a normal occurrency during a rolling operation. When this occurs, the flexible seal flanges will ride along the surrounding shoulder surfaces, thus changing the degree to which the flanges are deflected radially inwardly or outwardly. This changes the pressure at the flange/shoulder surface interface. At one extreme, when a flexible flange undergoes maximum inward deflection, the pressure at the flange/shoulder surface interface is increased and this in turn increases heat and friction. At the opposite extreme, when the flexible flange undergoes maximum outward deflection, the pressure at the flange/shoulder surface interface is decreased, thus raising the possibility that sealing integrity may be lost, particularly when the flexible flange and/or the surrounding shoulder surface has already undergone some frictional wear.

An object of the present invention is the provision of an improved flexible seal of the type generally described above having a novel and improved design which either obviates or at least substantially minimizes the aforementioned problems. In the preferred embodiment to be hereinafter described in greater detail, this is accomplished by providing an angularly disposed flexible lip integrally joined to the outer edge of one or both of the flexible seal flanges. Each lip is preferably joined to its respective flange by a means which accommodates resilient flexure of the lip. Each lip is preferably provided with a gradually diminishing thickness, with its minimum thickness being at the outer lip edge, and with its maximum thickness being less than thickness of the seal flange to which it is integrally joined. With this arrangement, when the seal is mounted on the roll neck within the confines of the seal end plate, each lip is flexed radially inwardly by the surrounding shoulder surface on the seal end plate. Because the lips are capable of being resiliently flexed in relation to their supporting flanges, and because the lips are relatively thin and tapered, and thus relatively more resilient than the flanges, the resulting pressure at the lip/shoulder surface interface is relatively light as compared with the prior art arrangement. By thus reducing the pressure at the lip/shoulder surface interface, friction is reduced, thereby providing longer seal life with improved sealing integrity.

The angular relationship of the lips to their respective flanges is also seen as a decided advantage because centrifugal force will be employed more effectively to urge the lips radially outwardly against the shoulder surfaces of the seal end plate. This effect will increase or decrease in direct proportion to the rotational speed of the roll, thus providing peak pressure at high rolling speeds, when it is most needed, because at higher rolling speeds more oil is pumped through the bearing.

Another objective of the present invention is the provision of an improved seal assembly embodying a flexible seal as described above in combination with a redesigned seal end plate having shoulders which have shoulder surfaces parallel to the rotational axis of the roll neck. With this arrangement, as the roll undergoes axial shifting, the seal lips will not experience changes in radial deflection. Thus, the pressure at the lip/shoulder surface interface will remain unaffected by axial roll shifting, and this in turn will promote longer seal life while reducing wear of the seal end plate shoulders.

Another object of the present invention is the provision of a flexible seal which is better adapted for mounting on the tapered section of a roll neck. In this connection it has been noted that with the prior art seal arrangement, the seal flanges are equal in length when the seal is unmounted. However, the stresses and resulting distortions experienced by the seal body when it is mounted on the tapered section of the roll neck cause the seal flanges to assume different radial lengths in the mounted condition. This problem has now been overcome with the present invention whereby preferably the seal flanges are molded with unequal lengths to compensate for any subsequent seal distortion during mounting.

These, as well as other objects and advantages of the present invention, will now be described in greater detail in connection with the accompanying drawings, wherein.

Figure 1:
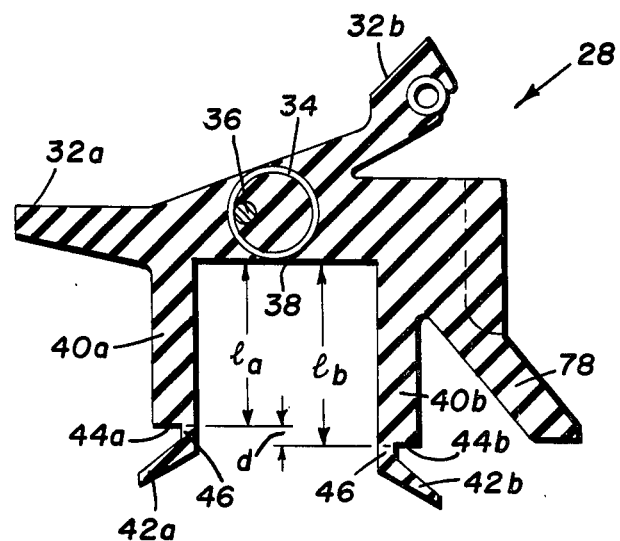
FIG. 1 is a cross-sectional view of a preferred embodiment of a flexible seal in accordance with the present invention.

Referring now to the drawings, and with initial reference to FIGS. 1–4, there is shown at 2 a roll having an end face 4 and a roll neck with a tapered intermediate section 6 leading to a more gradually tapered end section 8. A sleeve 10 is mounted on the tapered end section 8 and is fixed relative to the roll neck by conventional means (not shown) for rotation therewith. The sleeve 10 has an outer bearing surface 12 which is journalled for rotation within an interior bearing surface 14 of a fixed bushing 16 which is carried in a roll chock 18.

The sleeve 10 rotates with the roll while the roll chock 18 and the fixed bushing 16 are stationary. Oil in flooding quantity is fed continuously between the bearing surfaces 12 and 14. A circular extension 20 of the roll chock provides at its bottom portion a sump 22 in which the oil emerging from the bearing is continuously collected. The oil may be drawn away from the sump through a suitable piping connection 24 to be recycled back to the bearing surfaces.

Where the roll 2 is operating under "wet" conditions, coolant fluid is constantly flooding over the roll 2 and down over the end face 4. In spite of the centrifugal forces which tend to throw the coolant off of the roll, some of the coolant tends to work its way along the roll neck in the direction of the bearing. The objective of the seal assembly generally indicated at 26 and the flexible neck seal 28 which forms a part of the bearing assembly, is to prevent any of the coolant fluid from reaching and contaminating the bearing oil and, vice versa, preventing loss of oil from the bearing.

In the embodiment shown in FIGS. 1–4, the flexible neck seal 28 includes a flexible circular seal body 30 having inner surfaces 32a, 32b adapted to be mounted in sealing engagement on the tapered section 6 of the roll neck. The neck seal 28 is molded of a suitable resilient rubber-like material. Preferably, the seal body 30 is internally reinforced by an embedded combination of a coiled spring 34 and a steel cable 36 as described and claimed in U.S. Pat. No. 3,330,567 which is assigned to the same assignee as the present application.

Figure 2:
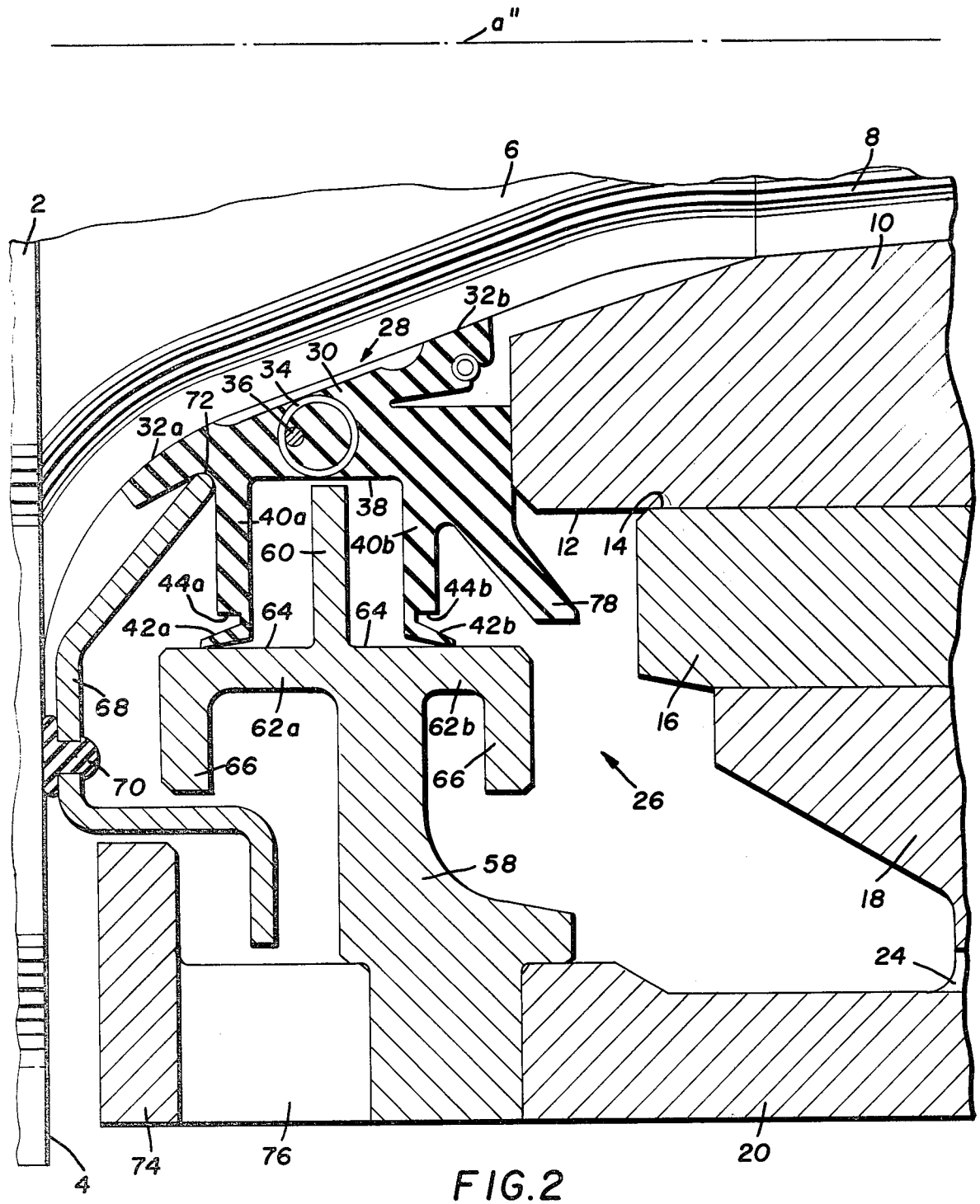
FIG. 2 is a cross-sectional view of a preferred embodiment of a seal assembly in accordance with the present invention, the said embodiment being specially adapted for "wet" applications where liquid coolant is being applied to the roll surfaces during the rolling operation.
Figure 4:
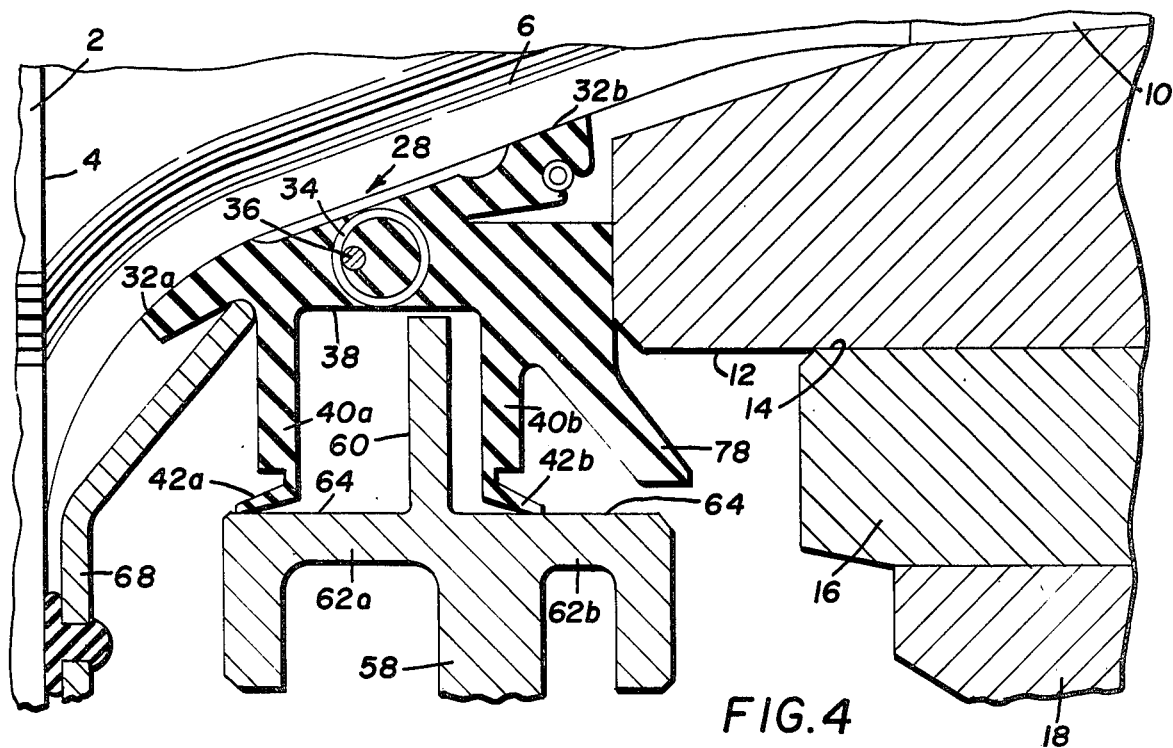
FIG. 4 is a sectional view on a reduced scale similar to FIG. 2, showing the condition of the seal assembly when the roll undergoes axial shifting during the rolling operation.

The seal body 30 has an exterior cylindrical surface 38 which is parallel to the rotational axis "a" of the roll 2 when the neck seal is in its mounted position as shown in FIG. 2. A pair of axially spaced circular flexible flanges 40a, 40b are integral with and extend radially outwardly from the seal body 30 at opposite ends of the exterior cylindrical surface 38. As is best shown in FIG. 1, the radial length "$l_a$" of flexible flange 40a is preferably less than the radial length "$l_b$" of flange 40b, with the difference between the two radial lengths being indicated at "d". The dimension "d" will vary depending on the diameter of the seal body 30, the seal material, etc. The purpose of having a difference "d" in the radial lengths of the flanges 40a, 40b is to compensate for the distortion and stresses which the flexible seal undergoes when it is mounted on the tapered section 6 of the roll neck. By having an initial difference "d" in radial lengths between the two flexible flanges, after the seal is mounted on the roll neck as shown in FIGS. 2 and 4, the effective radial lengths of the two flanges 40a, 40b are equal.

In a wet application, the flanges 40a, 40b of the flexible seal are each provided with circular flexible lips 42a, 42b. Each flexible lip is integrally joined to and extends angularly outwardly away from the outer edge 44a, 44b of its respective supporting flange.

Preferably the flexible lips 42a, 42b extend angularly in opposite directions away from the central portion of the seal body, thus making it difficult if not impossible for the lips to roll under during axial displacement of the roll. This in turn makes it possible to do away with the inclined shoulder surfaces of the prior art seal end plate. Preferably, each flexible lip is essentially identical in construction. Accordingly, and with specific reference to FIG. 3, it will be seen that each flexible lip is joined to its respective flexible supporting flange by a connecting means which accommodates resilient flexure of the lip relative to the flange. Preferably, this connecting means comprises an intermediate radial web 46 which is of lesser thickness than the thickness of the flange 40b. The natural resiliency of the seal material when combined with the reduced thickness of the intermediate web 46 allows the lip 42b to flex resiliently in relation to the flange 40b with minimum bending or distortion of the latter.

Figure 3:
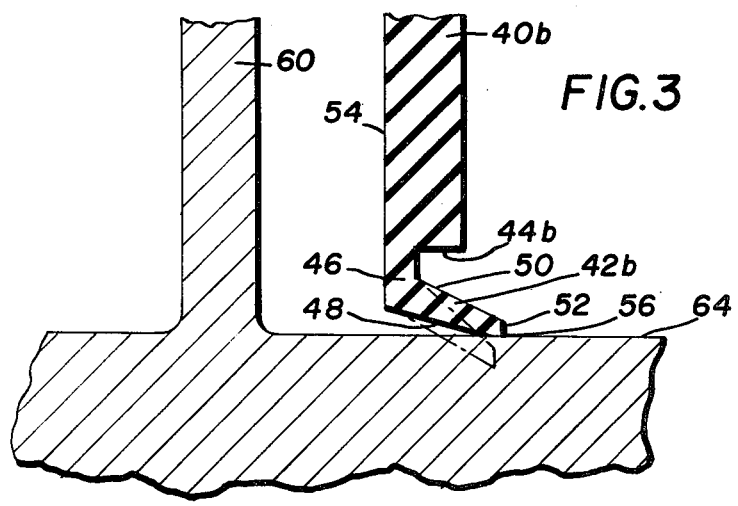
FIG. 3 is an enlarged sectional view of a portion of the seal assembly shown in FIG. 2.

Preferably, the flexible lips 42a, 42b are provided with a gradually diminishing thickness, with the minimum thickness being adjacent to the outer edge thereof. In this connection, and again as is best shown in FIG. 3, each lip is preferably provided with an outer face 48, an inner face 50 and an end face 52. The outer face 48 is disposed at an angle relative to, and provides a continuation of, one surface 54 of the flange to which the lip is integrally joined. The inner face 50 is disposed at an angle relative to the outer face 48, and the end face 52 is substantially parallel to the surface 54 while being disposed at acute and obtuse angles respectively relative to the outer and inner faces 48, 50. The juncture of the outer face 48 and the end face 52 provides a circular sealing edge 56.

In the embodiment shown in FIGS. 1–4, the seal assembly 26 includes the flexible neck seal 28 described above and in addition, a rigid circular seal end plate 58 which is mounted on the roll chock 18. The seal end plate has a radially inwardly extending rigid flange 60 which is perpendicular to the rotational axis "a" of the roll 2. The inner edge of flange 60 is spaced radially from the exterior cylindrical surface 38 on the flexible seal body. The seal end plate 58 further includes shoulders 62a, 62b extending in opposite directions from the base of the rigid flange 60. Each of the shoulders 62a, 62b has a cylindrical shoulder surface 64 which is parallel to the rotational axis "a". The cylindrical shoulder surfaces 64 surround the flexible seal flanges 40a, 40b and are arranged to be slidingly contacted by the flexible lips 42a, 42b.

The seal assembly 26 includes other features and components which will only be mentioned briefly since they are common to known prior art constructions and thus do not form a part of the present invention. More particularly, there are additional flanges 66 extending radially outwardly from the shoulders 62a, 62b of the seal end plate, an inner seal ring 68 having resilient buttons 70 engaging the end face 4 of the roll with the inner edge of the inner seal ring contacting the flexible seal body as at 72, and an outer seal ring 74 surrounding the inner seal ring 68 and having a drainage port 76 extending through its lower side.

During a rolling operation, the above-described apparatus will operate in the following manner: the inner seal ring 68, flexible neck seal 28 and sleeve 10 will rotate with the roll neck. The outer seal ring 74, seal end plate 58, chock 18 and bushing 16 will remain stationary. Lubricating oil will constantly flow from between the bearing surfaces 12 and 14. Most of this oil will be turned back by the rotating flinger 78 on the neck seal 28 and will thus be directed to the sump 22. Oil which succeeds in passing by the flinger 78 will be turned back by the rotating flange 40b and will be prevented from escaping between the flange 40b and the shoulder surface 64 by the flexible lip 42b which sealingly engages the shoulder surface 64. Likewise, the major portion of the coolant applied to the roll 2 will be turned back by the rotating inner seal ring 68. Any coolant which succeeds in passing by the inner seal ring 68 will be turned back by the rotating flange 40a on the neck seal 28 and will be prevented from passing between the flange 40a and its surrounding shoulder surface 64 by the flexible lip 42a.

Some of the specific advantages provided by the foregoing arrangement are as follows: the circular flexible lips 42a, 42b slidingly contact and sealingly engage the surrounding shoulder surfaces 64 of the seal end plate with a relatively light contact pressure as compared with prior art arrangements. This is due partially to the tapered reduced thickness of the lips 42a, 42b, and partially to the manner in which the lips are joined to their respective flanges to accommodate resilient flexure of the lips. This relatively light contact pressure minimizes frictional wear of both the lips 42a, 42b and the shoulder surfaces 64, and also minimizes any resulting frictional heat generated therebetween. These advantages translate directly into a longer useful life of both the neck seal 28 and the seal end plate 58.

By allowing the lips 42a, 42b to flex resiliently in relation to their respective supporting flanges 40a, 40b, the flanges are minimally bent or distorted by the surrounding seal end plate shoulders. This allows the flanges 40a, 40b to remain essentially parallel to the radial seal end plate flange 60, and thus obviates or at least substantially minimizes the likelihood that the flanges 40a, 40b will undergo permanent distortion.

The angularly disposed lips 42a, 42b will be urged outwardly against the shoulder surfaces 64 by centrifugal force. As previously mentioned, this effect will increase or decrease in direct proportion to the rotational speed of the roll, thus providing peak pressure at high rolling speeds, when it is most needed.

The arrangement of the seal end plate shoulder surfaces 64 in parallel relationship to the rotational axis "a" of roll 2 is also seen as a decided advantage in that it allows the relationship between the shoulder surfaces 64 and the circular flexible lips 42a, 42b to remain essentially constant regardless of the axial position of roll 2 with reference to its supporting chock 18. This is illustrated by a comparison of FIGS. 2 and 4. In FIG. 4, although the roll 2 has been axially shifted to one extreme, the radial relationship of the flexible lips 42a, 42b to the surrounding shoulder surfaces 64 remains essentially the same, thus allowing the sealing relationship therebetween to remain constant. Also, and again with reference to FIG. 4, it will be seen that axial roll displacement can take place without any resulting roll under of the lips 42a, 42b, even though the shoulder surfaces 64 are not inclined or tapered.

A further advantage is seen in the provision of flexible seal flanges 40a, 40b of different radial lengths to compensate for internal stresses and distortions experienced by the seal body 30 when it is mounted on the tapered section 6 of the roll neck. Here again, this feature contributes to a constant and predictable sealing relationship between the lips 42a, 42b and the shoulder surfaces 64 during subsequent operation of the mill.

Figure 5:
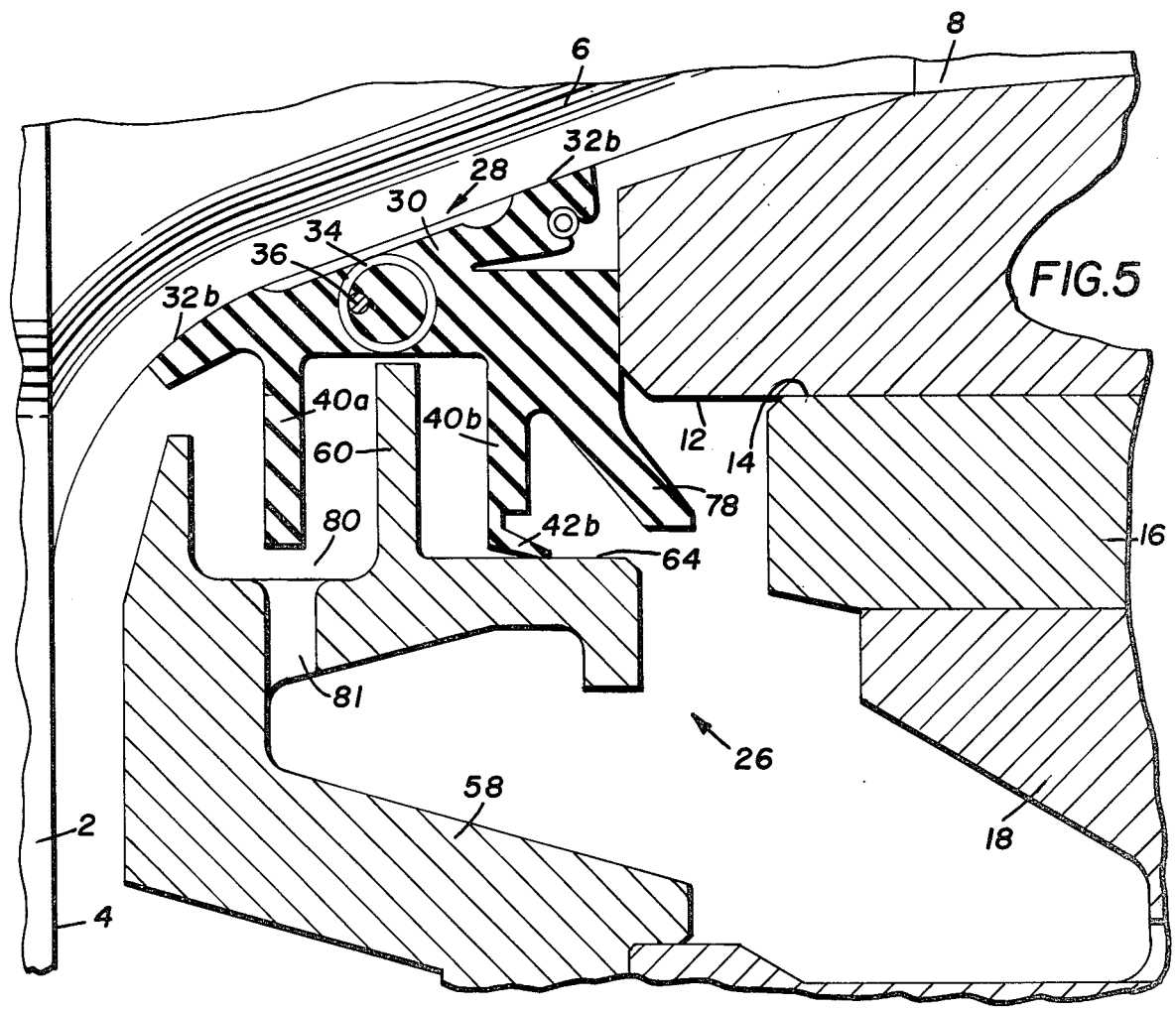
FIG. 5 is a sectional view showing a modified seal and seal assembly for use in a "dry" application, where coolant is not applied to the roll during a rolling operation.

Referring now to FIG. 5, an alternate embodiment of the invention is shown which is specially adapted for use in a "dry" application, i.e., one where coolant is not being applied to the roll during the rolling operation. With this arrangement, the neck seal 28 is again provided with a pair of radially extending flexible flanges 40a, 40b. However, only flange 40b has a flexible lip 42b associated therewith. The seal end plate 58 has only one cylindrical shoulder surface 64 surrounding the flange 40b and in sealing contact with the lip 42b. On the opposite side of the radial flange 60, the seal end plate 68 forms an enlarged circular groove 80 with a drainage port 81 at its lowermost side. The flexible seal flange 40a protrudes radially into the groove 80 but does not frictionally contact any surface on the seal end plate 58. This arrangement provides adequate sealing on dry applications where the prime function of the seal assembly is to contain oil in the bearing.

Figure 6:
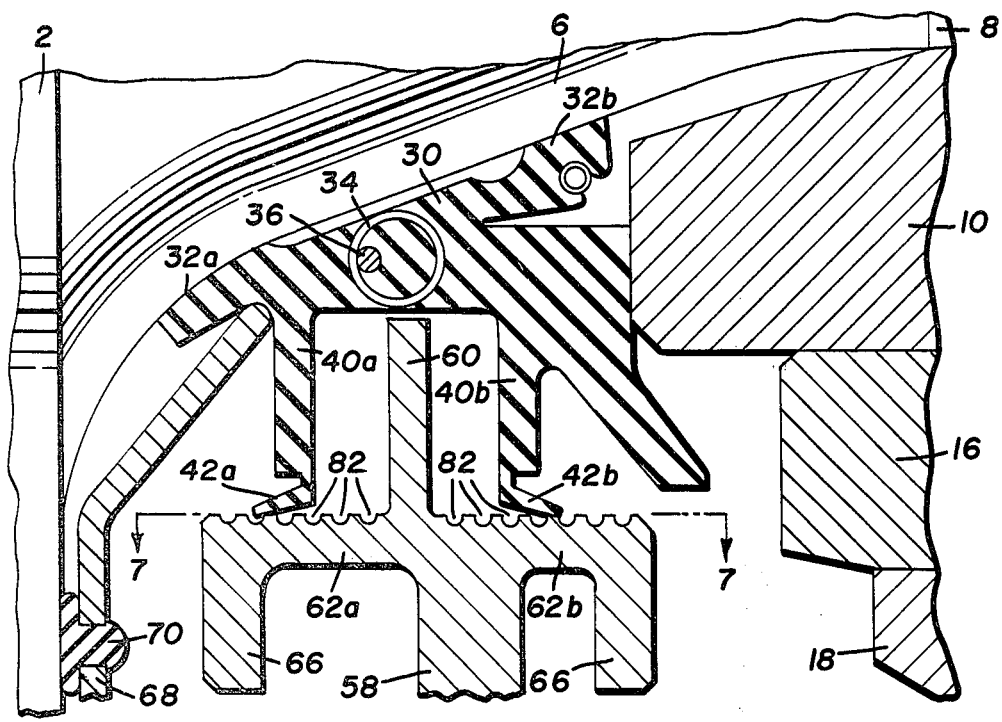
FIG. 6 is a sectional view similar to FIG. 2 showing a modification to the seal end plate shoulder surfaces.
Figure 7:
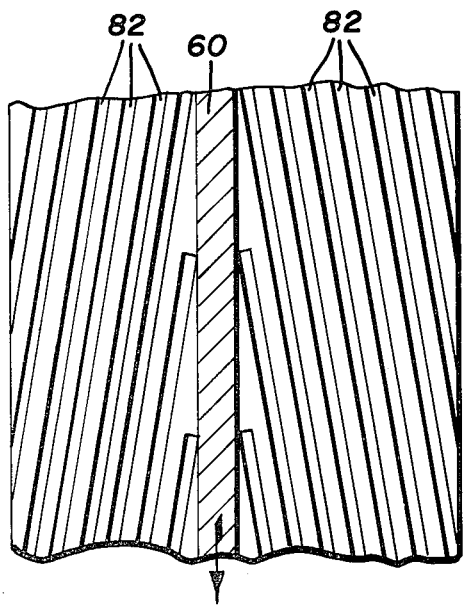
FIG. 7 is a sectional view taken along lines 7—7 of FIG. 6.

In the embodiment shown in FIGS. 6 and 7, all of the components are essentially identical to those shown in FIGS. 1–4, with the exception that the interior shoulder surfaces on the end plate shoulders 62a, 62b are threaded as at 82. The threads 82 urge the rotating flexible lips 42a, 42b away from the radial flange 60, while at the same time providing a pumping action which directs fluid, either coolant or oil, away from the lip/shoulder interface.

It is my intention to cover all changes and modifications of the embodiments herein chosen for purposes of disclosure which do not depart from the spirit and scope of the invention.

I claim:

1. A seal for use on the tapered section of a rotatable roll neck in a rolling mill, comprising: a flexible circular seal body adapted to be mounted in sealing engagement on said tapered section for rotation therewith, said seal body having a pair of axially spaced resilient circular flanges extending radially outwardly therefrom, said flanges being integral with and being supported exclusively by said seal body, at least one of said flanges having an angularly outwardly extending circular lip at the outer edge thereof, said lip having a portion which is integrally connected to said one flange and which enables said lip to flex resiliently with minimum bending and distortion of the thus supported one flange, whereby the space between said flanges remains essentially constant during lip flexure.

2. The seal as claimed in claim 1 wherein each of said flanges has one of said lips integrally connected at the outer edge thereof, said lips being arranged to extend angularly in opposite directions outwardly from said seal body.

3. The seal as claimed in claim 1 wherein said flanges are of unequal radial length.

4. The seal as claimed in claim 1 wherein said lip has a maximum thickness which is less than the thickness of the flange to which it is integrally connected.

5. The seal as claimed in claim 1 wherein said portion is comprised of an intermediate radial web which is of lesser thickness than the thickness of said one flange.

6. The seal as claimed in claim 1 wherein said lip gradually diminishes in thickness, with its minimum thickness being adjacent to the outer edge thereof.

7. The seal as claimed in claim 1 wherein said lip has an outer face, an inner face and an end face, said outer face being disposed at an angle relative to and providing a continuation of one surface of the flange to which said lip is integrally connected, said inner face being disposed at an angle relative to said outer face, and said end face being substantially parallel to the said one flange surface and disposed at an angle relative to said inner and outer faces, with the juncture of said outer face and said end face providing a circular sealing edge.

8. A flexible seal for a roll neck in a rolling mill, comprising: a circular seal body having a cylindrical outer surface and an inner surface adapted to be mounted in sealing engagement on a tapered section of said roll neck; a pair of axially spaced substantially parallel resilient circular flanges integrally joined to said seal body at opposite ends of said cylindrical outer surface; said flanges being supported exclusively by and extending radially outwardly from said seal body; annular lips arranged to provide oppositely directed angular extensions of said flanges, said lips having gradually diminishing thicknesses with the minimum thickness of each lip being at the outer edge thereof said lips each having portions which are integrally connected to their respective flanges and which enable said lips to flex resiliently with minimum accompanying bending and distortion of the thus supported flanges, whereby said flanges remain substantially parallel during lip flexure.

9. In a rolling mill, for use in combination with a roll neck journalled for rotation in a lubricated bearing which is in turn housed in a bearing chock, a seal assembly comprising: a circular seal end plate surrounding the roll neck and fixed relative to the bearing chock, said seal end plate having a radially inwardly extending first rigid flange perpendicular to the rotational axis of the roll neck, and a second rigid flange on one side of said first rigid flange extending towards said bearing, said second rigid flange having a cylindrical shoulder surface perpendicular to said first rigid flange; a flexible seal mounted in sealing engagement on the roll neck for rotation therewith, said flexible seal having a circular seal body with a cylindrical outer surface spaced radially inwardly from the inner edge of said first rigid flange, a pair of circular flexible flanges, supported exclusively by and extending radially outwardly from said seal body at opposite ends of said cylindrical outer surface, said flexible flanges being arranged on opposite sides of and being generally parallel to said first rigid flange, at least one of said flexible flanges having a flexible lip integrally connected at the outer edge thereof, said lip being arranged to extend angularly in relation to said one flexible flange in a direction away from said first rigid flange to sealingly engage the cylindrical shoulder surface on said second rigid flange, said lip having a portion which is integrally connected to said one flexible flange and which enables said lip to flex resiliently with minimum bending and distortion of the thus supported one flexible flange, whereby the space between said one flexible flange and said first rigid flange remains essentially constant and said lip remains in sealing engagement with the cylindrical shoulder surface of said second rigid flange during 360° of rotation of said roll neck and flexible seal relative to said seal end plate.

10. The seal assembly as claimed in claim 9 further characterized by another of said second rigid flanges having a cylindrical shoulder surface on the opposite side of said first rigid flange, each of said flexible seal flanges having one of said flexible lips integrally connected thereto, said lips extending angularly and in opposite directions away from said first rigid flange to sealingly engage the cylindrical shoulder surfaces on said second rigid flanges.

11. The seal assembly as claimed in claim 9 wherein said cylindrical shoulder surface is threaded to provide a means for urging said flexible lip away from said first rigid flange during rotation of said seal body.

* * * * *